United States Patent
Ahn et al.

(10) Patent No.: US 10,109,842 B2
(45) Date of Patent: Oct. 23, 2018

(54) BATTERY CELL

(71) Applicant: Hyundai Motor Company, Seoul (KR)

(72) Inventors: Seung Ho Ahn, Gyeonggi-do (KR); Ik Kyu Kim, Seoul (KR); Woo Jin Shin, Seoul (KR); Hong Seok Min, Gyeonggi-do (KR); Sung Min Choi, Gyeongsangbuk-do (KR); Jung Je Woo, Gyeonggi-do (KR); Jung Young Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 241 days.

(21) Appl. No.: 15/176,889

(22) Filed: Jun. 8, 2016

(65) Prior Publication Data

US 2017/0110711 A1    Apr. 20, 2017

(30) Foreign Application Priority Data

Oct. 16, 2015 (KR) .......................... 10-2015-0144667
Oct. 16, 2015 (KR) .......................... 10-2015-0144670

(51) Int. Cl.
| | |
|---|---|
| *H01M 2/34* | (2006.01) |
| *H01M 10/42* | (2006.01) |
| *H01M 10/0525* | (2010.01) |
| *H01M 2/02* | (2006.01) |
| *H01M 2/22* | (2006.01) |

(52) U.S. Cl.
CPC ......... *H01M 2/345* (2013.01); *H01M 2/0275* (2013.01); *H01M 2/22* (2013.01); *H01M 2/34* (2013.01); *H01M 10/0525* (2013.01); *H01M 10/4235* (2013.01); *H01M 2200/00* (2013.01); *H01M 2200/20* (2013.01)

(58) Field of Classification Search
None
See application file for complete search history.

(56) References Cited

U.S. PATENT DOCUMENTS

| | | | | |
|---|---|---|---|---|
| 8,557,420 B2 * | 10/2013 | Jeon | ...................... | H01M 2/348 429/211 |
| 2005/0014036 A1 * | 1/2005 | Kim | ...................... | H01M 2/021 429/7 |
| 2010/0233519 A1 * | 9/2010 | Cheon | ...................... | H01M 2/34 429/56 |
| 2011/0143177 A1 * | 6/2011 | Jeon | ...................... | H01M 2/348 429/61 |
| 2011/0151285 A1 * | 6/2011 | Hong | ...................... | H01M 2/105 429/7 |
| 2011/0183161 A1 | 7/2011 | Son et al. | | |

(Continued)

FOREIGN PATENT DOCUMENTS

| | | |
|---|---|---|
| KR | 2009-0013867 A | 2/2009 |
| KR | 10-2011-0034346 A | 4/2011 |

(Continued)

*Primary Examiner* — Scott J. Chmielecki
(74) *Attorney, Agent, or Firm* — Mintz Levin Cohn Ferris Glovsky and Popeo, P.C.; Peter F. Corless

(57) ABSTRACT

A battery cell includes: an electrode assembly; a pouch case accommodating the electrode assembly therein; and an electrode lead including an outer lead protruding to an outside of the pouch case and an inner lead disposed between the outer lead and the electrode assembly, accommodated in the pouch case, and cut by expansion force of the pouch case.

21 Claims, 17 Drawing Sheets

(56) References Cited

U.S. PATENT DOCUMENTS

| | | | |
|---|---|---|---|
| 2012/0040235 A1 | 2/2012 | Cho et al. | |
| 2012/0121936 A1* | 5/2012 | Baek | H01M 10/42 429/7 |
| 2013/0196189 A1 | 8/2013 | Minami et al. | |
| 2014/0045036 A1* | 2/2014 | Schaefer | H01M 2/206 429/156 |
| 2015/0072185 A1* | 3/2015 | Cho | H01M 2/30 429/56 |
| 2016/0028068 A1* | 1/2016 | Yang | H01M 2/1235 429/61 |
| 2016/0141593 A1* | 5/2016 | Min | H01M 2/06 429/61 |
| 2017/0117515 A1* | 4/2017 | Ahn | H01M 2/345 |

FOREIGN PATENT DOCUMENTS

| | | |
|---|---|---|
| KR | 10-2011-0048470 A | 5/2011 |
| KR | 10-2012-0013883 A | 2/2012 |
| KR | 2014-0032165 A | 3/2014 |
| KR | 10-2014-0139793 A | 12/2014 |
| KR | 10-2014-0141262 A | 12/2014 |
| KR | 2016-0060510 A | 5/2016 |

\* cited by examiner

BATTERY CELL

CROSS-REFERENCE TO RELATED APPLICATION

This application claims under 35 U.S.C. § 119(a) the benefit of Korean Patent Application Nos. 10-2015-0144667 and 10-2015-0144670, both of which were filed on Oct. 16, 2016 in the Korean Intellectual Property Office, the entire contents of which are incorporated by reference herein.

BACKGROUND (a) Technical Field

The present invention relates to a battery cell, and more particularly, to a pouch type battery cell capable of blocking a flow of current at the time of generation of overcharge.

(b) Description of the Related Art

In accordance with an increase in the use of portable electrical products such as video cameras, cell phones, personal computers (PCs), tablets, and the like, the importance of a secondary battery for use with such products as a driving power supply has increased.

The secondary battery that may be charged and discharged has been actively studied in accordance with the development of state-of-the-art fields such as a digital camera, a cellular phone, a laptop computer, a power tool, an electric bicycle, an electric vehicle, a hybrid vehicle, a large-capacity power storage, and the like.

Particularly, a lithium secondary battery has energy density per unit weight higher than that of other secondary batteries such as an existing lead storage battery, nickel-cadmium battery, nickel-hydrogen battery, nickel-zinc battery, and the like, and may be rapidly charged. Therefore, the use of a lithium secondary battery has increased.

The lithium secondary battery, which has an operating voltage of 3.6V or more, is used as a power supply of a portable electronic device, or a plurality of lithium secondary batteries connected to each other in series or in parallel are used in a high output electric vehicle, hybrid vehicle, power tool, electric bicycle, power storage, uninterruptible power supply (UPS), and the like.

Since the lithium secondary battery has an operating voltage three times higher than that of a nickel-cadmium battery or a nickel-metal hydride battery and has energy density characteristics per unit weight better than those of the nickel-cadmium battery or the nickel-metal hydride battery, the use of the lithium secondary battery has rapidly increased.

A lithium ion battery using a liquid electrolyte typically is used in a form in which it is welded and sealed using a metal can having a cylindrical shape or a prismatic shape as a container. A can type secondary battery using the metal can as the container has a fixed form, which limits a design of an electrical product using the can type secondary battery as a power supply and makes it difficult to reduce the volume thereof. Therefore, a pouch type secondary battery in which an electrode assembly and an electrolyte are put and sealed in a pouch package formed of a film has been developed and used.

However, in the case in which the lithium secondary battery is overheated, there is a risk that the lithium secondary battery will explode, such that it is important that the lithium secondary battery be packaged in a stable manner, so as to avoid explosion.

Overheating of the lithium secondary battery is generated due to several causes. One of these causes may be a case in which an over-current of a limit or more flows through the lithium secondary battery. When the over-current flows, heat is generated in the lithium secondary battery by Joule's heat, such that an internal temperature of the lithium secondary battery rapidly rises. In addition, the rapid rise in the internal temperature causes a decomposition reaction of an electrolyte solution to generate thermal runaway, which can lead to the explosion of the lithium secondary battery. The over-current is generated in the case in which a sharp metal object penetrates through the lithium secondary battery, insulation between a cathode and an anode is broken due to shrinkage of a separator interposed between the cathode and the anode, or a rush current is applied to the lithium secondary battery due to abnormality of a charging circuit or a load connected to the outside.

Therefore, the lithium secondary battery is used in a state in which it is coupled to a protection circuit in order to be protected from an abnormal situation such as a situation in which the over-current is generated, and a fuse element irreversibly disconnecting a line through which a charging or discharging current flows when the over-current is generated is generally included in the protection circuit. However, in the case in which the fuse element malfunctions, internal pressure of the lithium secondary battery configuring a battery module and/or a battery pack, that is, a battery cell, may be continuously increased, such that there is a risk such as ignition, explosion, or the like.

Therefore, there is a need to more securely block a flow of a current at the time of an increase in the internal pressure of the battery cell to secure safety.

SUMMARY

An aspect of the present invention provides an electrode lead automatically blocking a current applied to a battery cell when the battery cell is overcharged.

An aspect of the present invention also provides a technology of blocking a current applied to a battery cell through a mechanical operation without using a separate power supply or controller.

An aspect of the present invention also provides an electrode lead having a current blocking function and capable of being formed in an integrated type.

An aspect of the present invention also provides a technology of reducing a resistance by minimizing a path through which a current flows.

Aspects of the present invention are not limited to the above-mentioned aspects. That is, other aspects that are not mentioned may be obviously understood by those skilled in the art from the following specification.

According to an exemplary embodiment of the present invention, a battery cell includes: an electrode assembly; a pouch case accommodating the electrode assembly therein; and an electrode lead including an outer lead protruding to an outside of the pouch case and an inner lead disposed between the outer lead and the electrode assembly, accommodated in the pouch case, and cut by expansion force of the pouch case.

According to another exemplary embodiment of the present invention, a battery cell includes: an electrode assembly; a pouch case accommodating the electrode assembly therein; and an electrode lead including an outer lead protruding to an outside of the pouch case and an inner lead disposed between the outer lead and the electrode assembly, accommodated in the pouch case, and having a notch formed therein, one side of the inner lead based on the notch being coupled to the pouch case and the other side of the inner lead based on the notch being separated from the pouch case.

According to an exemplary embodiment of the present invention, a battery cell includes: an electrode assembly; a pouch case accommodating the electrode assembly therein; and an electrode lead including an outer lead protruding to an outside of the pouch case and an inner lead disposed between the outer lead and the electrode assembly, accommodated in the pouch case, and separated into both sides in a direction in which the pouch case is expanded.

According to another exemplary embodiment of the present invention, a battery cell includes: an electrode assembly; a pouch case accommodating the electrode assembly therein; and an electrode lead including an outer lead protruding to an outside of the pouch case and an inner lead disposed between the outer lead and the electrode assembly and accommodated in the pouch case, wherein the inner lead includes a first inner lead and a second inner lead each coupled to the pouch case and overlapped with each other.

Detailed contents of other exemplary embodiments are described in a detailed description and are illustrated in the accompanying drawings.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
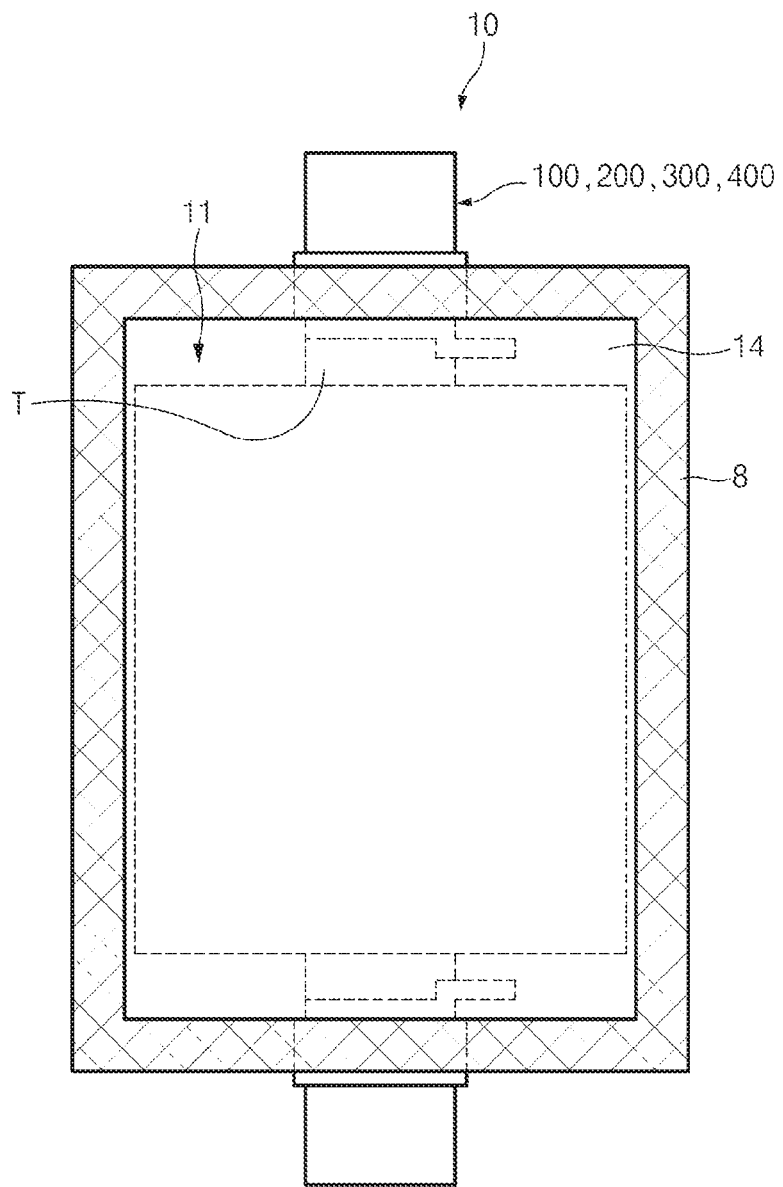
FIG. 1 is a plan view of a battery cell according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an " and "the " are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various advantages and features of the present invention and methods accomplishing them will become apparent from the following description of exemplary embodiments with reference to the accompanying drawings.

However, the present invention is not limited to exemplary embodiments to be described below, but may be implemented in various different forms, these exemplary embodiments will be provided only in order to make the present invention complete and allow those skilled in the art to completely recognize the scope of the present invention, and the present invention will be defined by the scope of the claims. Throughout the specification, like reference numerals denote like elements.

Hereinafter, a battery cell according to an exemplary embodiment of the present invention will be described with reference to the accompanying drawings FIG. 1 is a plan view of a battery cell according to an exemplary embodiment of the present invention.

Referring to FIG. 1, the battery cell 10 includes an electrode assembly 11, a pair of electrode leads 100, 200, or 300; a pouch adhesion layer 110, 210, or 310; and a pouch case 14.

The electrode assembly 11 includes a cathode plate, an anode plate, a separator, and electrode tabs T. The electrode assembly 11 may be a stack type electrode assembly formed by interposing the separator between the cathode plate and the anode plate that are stacked.

In addition, the electrode assembly 11 may also be formed in a jelly-roll type.

The cathode plate may be formed by applying a cathode active material to a collecting plate made of aluminum (Al). In addition, the anode plate may be formed by applying an anode active material to a collecting plate made of copper (Cu).

The electrode tabs T, which are formed integrally with electrode plates, that is, the cathode plate or the anode plate, corresponds to non-coated regions in which an electrode active material is not applied in electrode plates 11a and 11b. In particular, the electrode tabs T include a cathode tab corresponding to a region in which the cathode active material is not applied in the cathode plate, and an anode tab corresponding to a region in which the anode active material is not applied in the anode plate.

The electrode leads 100, 200, or 300, which are thin planar metals, are attached to the electrode tabs T and are extended outward from the electrode assembly 11. The electrode leads 100, 200, or 300 include a cathode lead attached to the cathode tab and an anode lead attached to the anode tab. The cathode lead and the anode lead may be extended in the same direction or be extended in opposite directions depending on positions of the cathode tab and the anode tab.

The pouch adhesion layer 110, 210, or 310, which is attached to a circumference of the electrode lead 100, 200, or 300 in a width direction and is interposed between the electrode lead 100, 200, or 300 and an inner surface of the pouch case 14, is formed of a film having an insulation property and a heat-fusion property. The pouch adhesion layer 110, 210, or 310 may be a layer (a single layer or a multi-layer) made of one or more materials selected from the group consisting of polyimide (PI), polyprophylene (PP), polyethylene (PE), polyethylene terephthalate (PET), and the like.

The pouch adhesion layer 110, 210, or 310 prevents generation of a short-circuit between the electrode lead 100, 200, or 300 and a metal layer of the pouch case 14. In addition, the pouch adhesion layer 110, 210, or 310 serves to improve sealing force of the pouch case 14 in a region in which the electrode lead 100, 200, or 300 is led.

That is, since the electrode lead 100, 200, or 300 formed of a metal plate and the inner surface of the pouch case 14 are not adhered to each other well, even though an edge region B of the pouch case 14 is heat-fused to seal the pouch case, a sealing property in the region in which the electrode lead 100, 200, or 300 is led may be deteriorated. In addition, this sealing property deterioration phenomenon is intensified in the case in which nickel (Ni) is coated on a surface of the electrode lead 100, 200, or 300.

Therefore, the pouch adhesion layer 110, 210, or 310 is interposed between the electrode lead 100, 200, or 300 and the inner surface of the pouch case 14, thereby making it possible to improve a sealing property of the battery cell 10.

The pouch case 14 is sealed by heat-fusing the edge region B that a first surface 14a and a second surface 14b contact each other in a state in which it accommodates the electrode assembly 11 therein so that the electrode lead 100, 200, or 300 is led to an outside of the pouch case 14.

The pouch case 14 may have a multilayer structure in order to secure an excellent heat-fusion property, rigidity for maintaining a shape and protecting the electrode assembly 11, and an insulation property. For example, the pouch case 14 may have the multilayer structure including a first layer positioned at the innermost side to face the electrode assembly 11, a second layer positioned at the outermost layer to thereby be exposed directly to an external environment, and a third layer interposed between the first layer and the second layer.

In this case, for example, the first layer may be made of a material having corrosion resistance to an electrolyte solution, an insulation property, and a heat fusion property, such as polyprophylene (PP), the second layer may be made of a material having rigidity for maintaining a shape and an insulation property, such as polyethylene terephthalate (PET), and the third layer may be formed of a metal such as aluminum (Al).

Gas may be generated in the battery cell in an abnormal situation such as generation of a short-circuit, overcharge, or the like, in the battery cell 10. The pouch case 14 is expanded due to the gas, and may be exploded when the abnormal situation is not solved.

Figure 2:
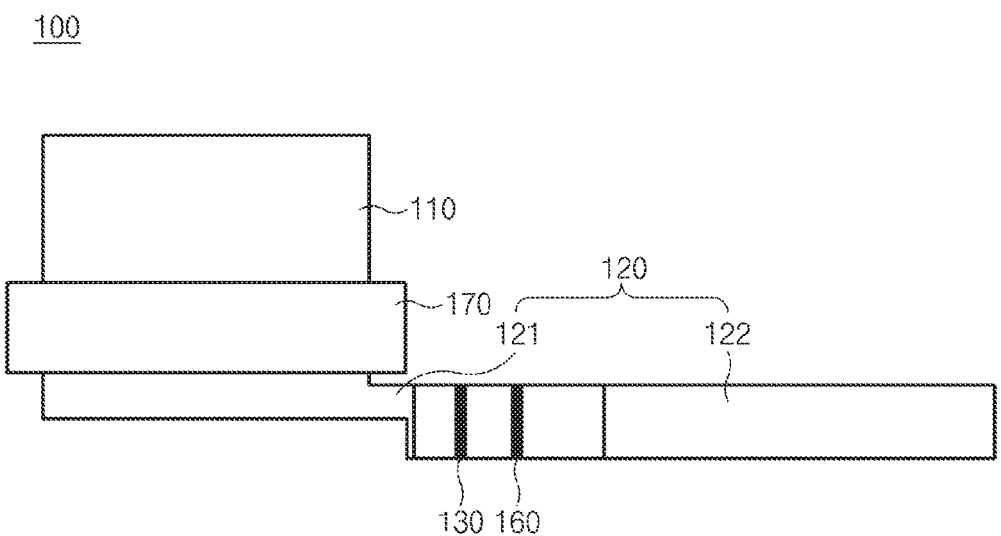
FIG. 2 is a plan view of an electrode lead according to an exemplary embodiment of the present invention before being assembled.
Figure 3:
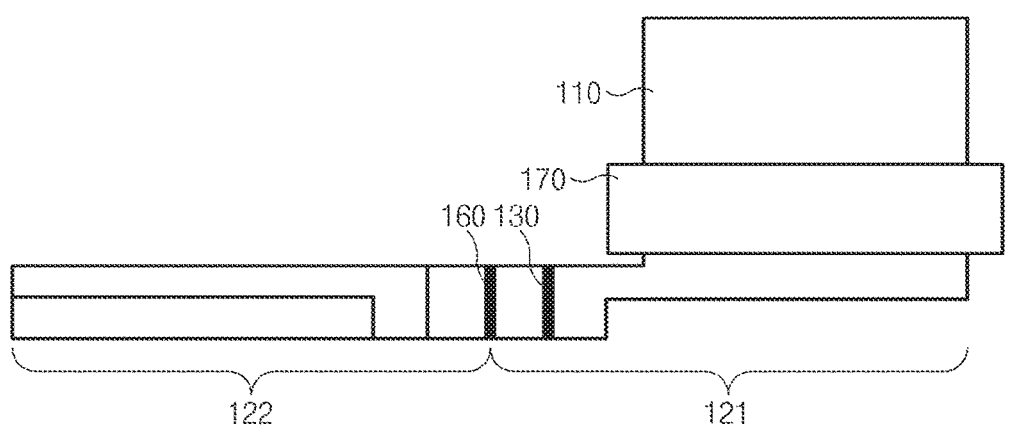
FIG. 3 is a rear view of the electrode lead of FIG. 2 according to an exemplary embodiment of the present invention before being assembled.
Figure 4:
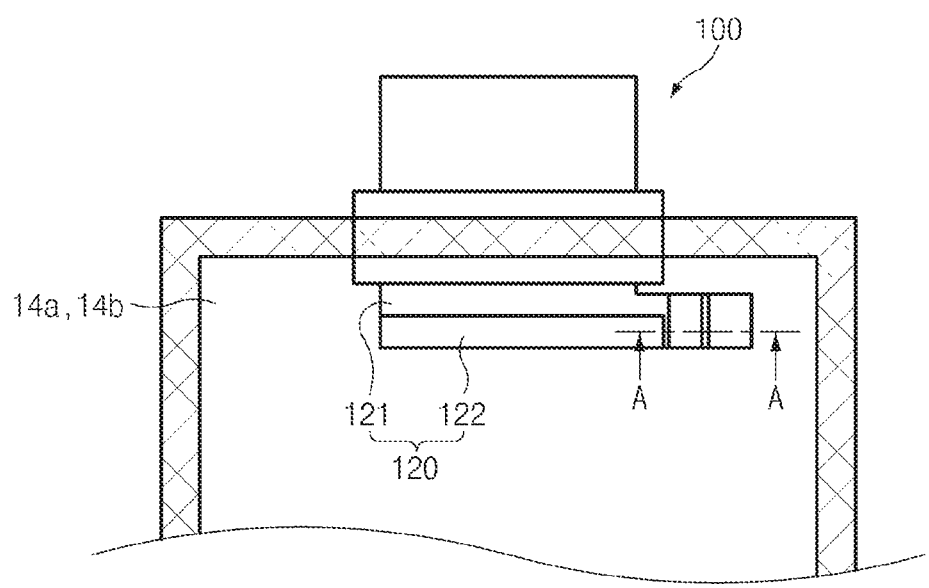
FIG. 4 is a plan view illustrating a state in which the electrode lead according to an exemplary embodiment of the present invention and a pouch case are coupled to each other.

FIG. 2 is a plan view of an electrode lead 100 according to an exemplary embodiment of the present invention before being assembled. FIG. 3 is a rear view of the electrode lead 100 according to an exemplary embodiment of the present invention before being assembled. FIG. 4 is a plan view illustrating a state in which the electrode lead 100 according to an exemplary embodiment of the present invention and a pouch case 14 are coupled to each other.

Referring to FIGS. 2 to 4, the battery cell 10 according to the present exemplary embodiment includes the electrode assembly 11; the pouch case 14 accommodating the electrode assembly 11 therein; and the electrode lead 100 including an outer lead 110 protruding to the outside of the pouch case 14 and an inner lead 120 disposed between the outer lead 110 and the electrode assembly 11, accommodated in the pouch case 14, and moving in opposite directions by expansion force of the pouch case 14 to thereby be cut The battery cell 10 according to the present exemplary embodiment includes the electrode assembly 11; the pouch case 14 accommodating the electrode assembly 11 therein; and the electrode lead 100 including the outer lead 110 protruding to the outside of the pouch case 14 and the inner lead 120 disposed between the outer lead 110 and the electrode assembly 11, accommodated in the pouch case 14, and having a notch formed therein, one side of the inner lead based on the notch being coupled to the pouch case 14 and the other side of the inner lead based on the notch being separated from the pouch case 14.

The pouch case 14 has the first surface 14a and the second surface 14b facing each other, and the inner lead 120 includes a first inner lead 121 connected to the outer lead 110 and coupled to the first surface 14a; and a second inner lead 122 connected to the first inner lead 121, coupled to the second surface 14b, and connected to the electrode assembly 11.

A pouch adhesion layer 170 coupling the pouch case 14 and the inner lead 120 to each other is formed in at least one of a space between the first surface 14a and the first inner lead 121 and a space between the second surface 14b and the second inner lead 122, and the inner lead 120 has a weak part 130 formed between a portion thereof that is coupled to the pouch case 14 by the pouch adhesion layer 170 and a portion thereof that is not coupled to the pouch case 14, the weak part 130 having brittleness higher than that of other portions.

A notch is formed in the weak part 130. The notch may have a groove shape or have a shape in which holes are formed at predetermined intervals. The notch promotes fracture of the electrode lead 100.

The first inner lead 121 and the second inner lead 122 are disposed so as to be overlapped with each other, and a lead adhesion layer 140 containing an insulation and adhesion component is formed between the first inner lead 121 and the second inner lead 122.

An insulator 150 that does not have adhesive properties preferably insulates the first inner lead 121 and the second inner lead 122 from each other, and is disposed between the first inner lead 121 and the second inner lead 122, where the lead adhesion layer 140 is disposed at one side based on the weak part 130 and the insulator 150 is disposed at the other side based on the weak part 130.

The lead adhesion layer 140 is disposed at one side of the insulator 150, and a bent part 160 bent when the pouch case 14 is expanded is formed at the other side of the insulator 150. A notch is formed in the bent part 160.

The first inner lead 121 and the second inner lead 122 are formed integrally with each other, and the bent part 160 is formed at a portion connecting the first inner lead 121 and the second inner lead 122 to each other. The pouch adhesion layer 170 is disposed at only one side based on the weak part 130. The bent part 160 bent when the pouch case 14 is expanded is formed at an end portion of a portion at which the pouch adhesion layer 170 is formed based on the weak part 130.

The first inner lead 121 and the second inner lead 122 are formed integrally with each other, and the bent part 160 is formed at a portion connecting the first inner lead 121 and the second inner lead 122 to each other. The first inner lead 121 and the second inner lead 122 are compressed from the weak part 130 to the bent part 160 to thereby be bonded to each other so as to conduct electricity. At least one of the first inner lead 121 and the second inner lead 122 may be made of a plastic material that is plastically deformed by the expansion of the pouch case 14.

Figure 5A:
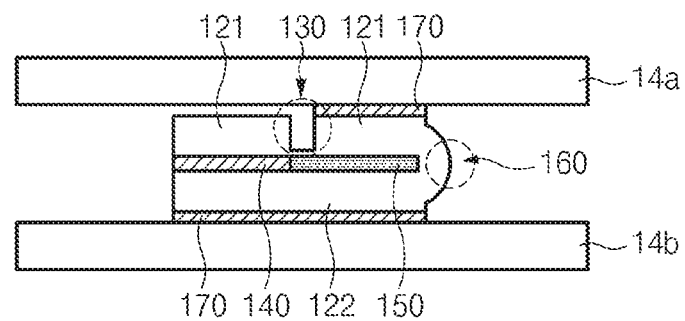
FIG. 5A is a cross-sectional view taken along line A-A of FIG. 4 when the battery cell is in a normal state.
Figure 5B:
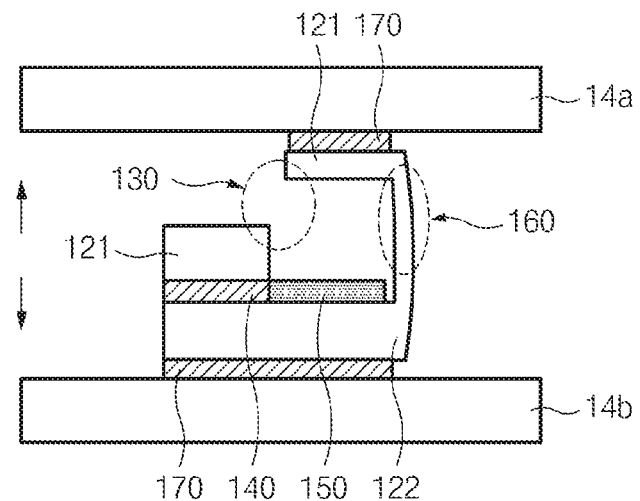
FIG. 5B is a cross-sectional view taken along line A-A of FIG. 4 when the battery cell is in a state in which a pouch case is expanded, such that the electrode lead is cut.

FIG. 5A is a cross-sectional view taken along line A-A of FIG. 4 when the battery cell 10 is in a normal state; FIG. 5B is a cross-sectional view taken along line A-A of FIG. 4 when the battery cell 10 is in a state in which a pouch case is expanded, such that the electrode lead 100 is cut; and FIG. 5C is a cross-sectional view taken along line A-A of FIG. 4 when the battery cell 10 is in a state in which the pouch case is contracted after being expanded.

Figure 5C:
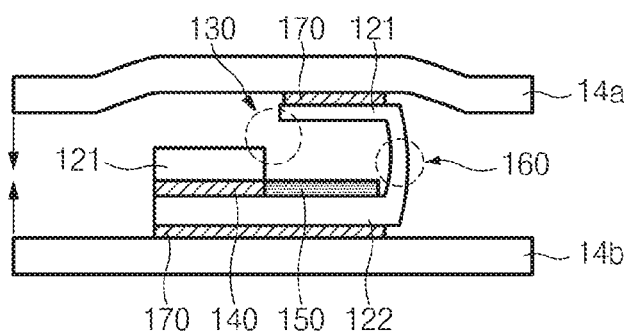
FIG. 5C is a cross-sectional view taken along line A-A of FIG. 4 when the battery cell is in a state in which the pouch case is contracted after being expanded.

Referring to FIGS. 5A to 5C, when the battery cell 10 is normally operated, gas is not present in the battery cell 10, such that the first inner lead 121 and the second inner lead 122 are maintained in a state in which they are overlapped with each other. When the gas is filled in the battery cell 10 due to generation of overcharge, the pouch case 14 is expanded. When the pouch case 14 is expanded, tension is generated in the first inner lead 121 and the second inner lead 122 in a direction in which the first inner lead 121 and the second inner lead 122 become distant from each other.

Meanwhile, the first inner lead 121 and the second inner lead 122 are spaced apart from each other at a portion at which the insulator 150 that does not have adhesive properties is disposed. Since force acts on the first inner lead 121 and the second inner lead 122 in the direction in which the first inner lead 121 and the second inner lead 122 become distant from each other due to the pouch adhesion layer 170, fracture is generated in the weak part 130. Therefore, the first inner lead 121 and the second inner lead 122 lose a function of a conducting wire, and a current is blocked. Then, even though the pouch case 14 is contracted, a shape in which the first inner lead 121 and the second inner lead 122 are spaced apart from each other is maintained as it is since the electrode lead 100 is made of a plastic material. Therefore, even though an abnormal state ends, an overcurrent does not again flow to the electrode assembly 11, and stability in the use of the battery cell 10 may be secured.

Although only the case in which the weak part 130 and the bent part 160 are separately formed has been illustrated in FIGS. 2 through 5C, the weak part 130 may also be formed in the bent part 160. In this case, an end portion of the pouch adhesion layer 170 may serve as a hinge shaft.

Meanwhile, although not illustrated separately in the accompanying drawings, the first inner lead 121 and the second inner lead 122 may also be bonded to each other in a compression scheme without using the insulator. That is, a current passing through the weak part 130 moves directly toward the second inner lead 122 without moving toward the bent part 160. In this case, a length of a conducting wire is shortened due to absence of the insulator. That is, a current path is shortened, such that a resistance is reduced.

Figure 6:
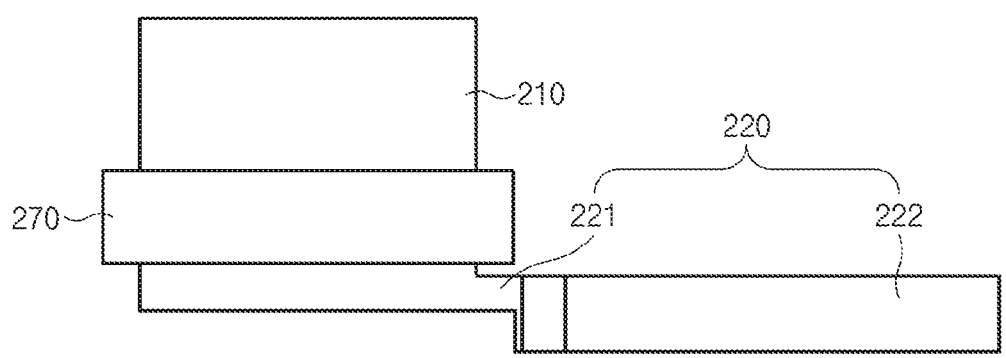
FIG. 6 is a plan view of an electrode lead according to another exemplary embodiment of the present invention before being assembled.
Figure 7:
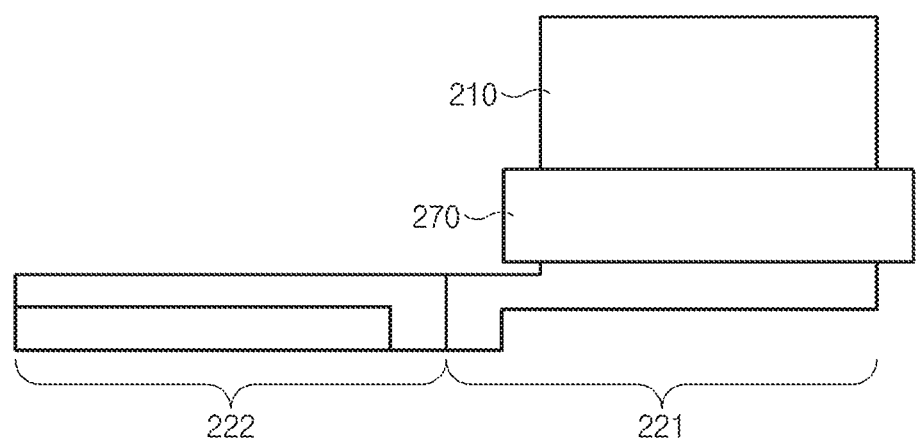
FIG. 7 is a rear view of the electrode lead according to another exemplary embodiment of the present invention before being assembled.
Figure 8:
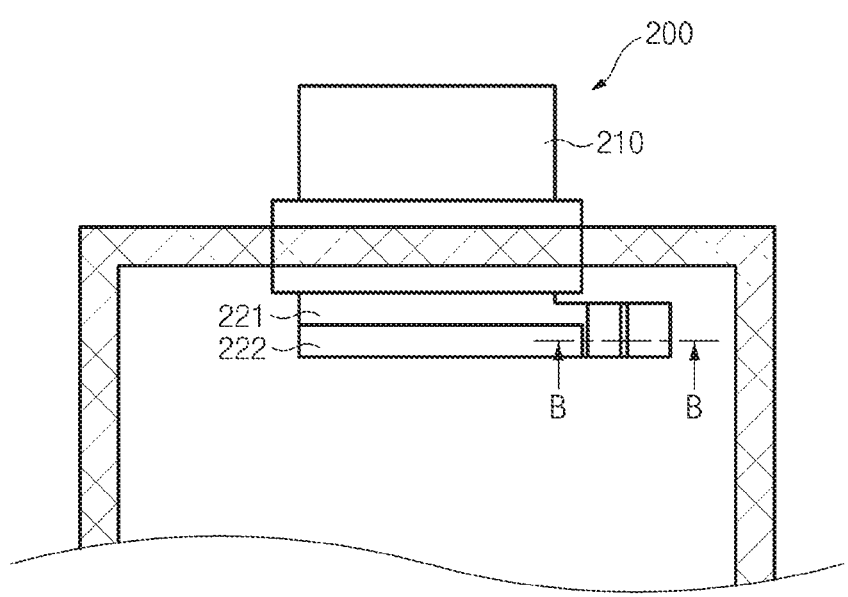
FIG. 8 is a plan view illustrating a state in which the electrode lead according to another exemplary embodiment of the present invention and a pouch case are coupled to each other.

FIG. 6 is a plan view of an electrode lead 200 according to another exemplary embodiment of the present invention before being assembled. FIG. 7 is a rear view of the electrode lead 200 according to another exemplary embodiment of the present invention before being assembled. FIG. 8 is a plan view illustrating a state in which the electrode lead 200 according to another exemplary embodiment of the present invention and a pouch case 14 are coupled to each other.

Referring to FIGS. 6 to 8, the battery cell 10 according to the present exemplary embodiment includes the electrode assembly 11; the pouch case 14 accommodating the electrode assembly 11 therein; and the electrode lead 200 including an outer lead 210 protruding to the outside of the pouch case 14 and an inner lead 220 disposed between the outer lead 210 and the electrode assembly 11, accommodated in the pouch case 14, and separated into both sides in a direction in which the pouch case 14 is expanded.

The battery cell 10 according to the present exemplary embodiment includes the electrode assembly 11; the pouch case 14 accommodating the electrode assembly 11 therein; and the electrode lead 200 including the outer lead 210 protruding to the outside of the pouch case 14 and the inner lead 220 disposed between the outer lead 210 and the electrode assembly 11 and accommodated in the pouch case 14, wherein the inner lead 220 includes a first inner lead 221 and a second inner lead 222 each coupled to the pouch case 14 and overlapped with each other.

The pouch case 14 has the first surface 14_a_ and the second surface 14_b_ facing each other, and the inner lead 220 includes a first inner lead 221 connected to the outer lead 210 and coupled to the first surface 14_a_; and a second inner lead 222 connected to the first inner lead 221, coupled to the second surface 14_b_, and connected to the electrode assembly 11. Pouch adhesion layers 270 coupling the pouch case 14 and the inner lead 220 to each other are formed between the first surface 14_a_ and the first inner lead 221 and between the second surface 14_b_ and the second inner lead 222, and a weak part 230 having brittleness higher than that of the pouch adhesion layers 270 is formed in the inner lead 220.

A notch is formed in the weak part 230. The notch may have a groove shape or have a shape in which holes are formed at predetermined intervals. The notch promotes fracture of the electrode lead 200. The first inner lead 221 and the second inner lead 222 are formed integrally with each other, and the weak part 230 is formed at a portion connecting the first inner lead 221 and the second inner lead 222 to each other. The first inner lead 221 and the second inner lead 222 are disposed so as to be overlapped with each other, and a lead adhesion layer 240 containing an insulation and adhesion component is formed between the first inner lead 221 and the second inner lead 222.

An insulator 250 that does not have adhesive properties preferably insulates the first inner lead 221 and the second inner lead 222 from each other, and is disposed between the first inner lead 221 and the second inner lead 222. A bent part 260 bent when the pouch case 14 is expanded is formed at an end portion of the pouch adhesion layer 270. The bent part 260 is formed at one side of the insulator 250, and the weak part 230 is formed at the other side of the insulator 250. The weak part 230 is formed at an end portion of the lead adhesion layer 240.

The bent part 260 bent when the pouch case 14 is expanded is formed at an end portion of the pouch adhesion layer 270. A notch is formed in the bent part 260. The notch may have a groove shape or have a shape in which holes are formed at predetermined intervals. The notch promotes fracture of the electrode lead 200. The first inner lead 221 and the second inner lead 222 are compressed from the weak part 230 to the bent part 260 to thereby be bonded to each other so as to conduct electricity. At least one of the first inner lead 221 and the second inner lead 222 may be made of a plastic material that is plastically deformed by the expansion of the pouch case 14.

Figure 9A:
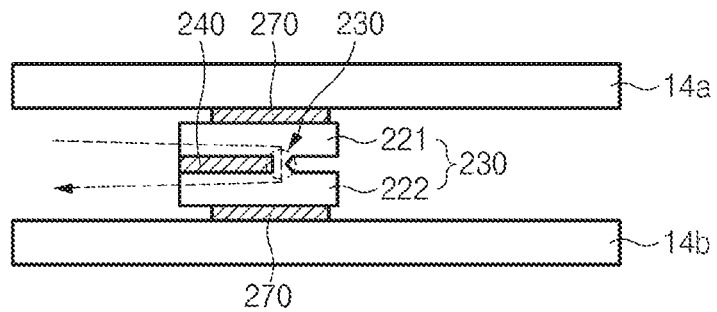
FIG. 9A is a cross-sectional view taken along line A-A of FIG. 8 when the battery cell is in a normal state.
Figure 9B:
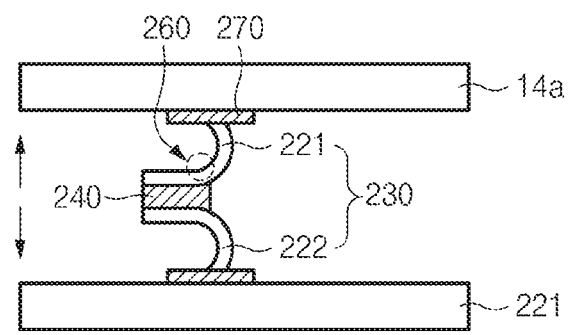
FIG. 9B is a cross-sectional view taken along line A-A of FIG. 8 when the battery cell is in a state in which a pouch case is expanded, such that the electrode lead is cut.

FIG. 9A is a cross-sectional view taken along line A-A of FIG. 8 when the battery cell 10 is in a normal state; FIG. 9B is a cross-sectional view taken along line A-A of FIG. 8 when the battery cell 10 is in a state in which a pouch case is expanded, such that the electrode lead 200 is cut; and FIG. 9C is a cross-sectional view taken along line A-A of FIG. 8 when the battery cell 10 is in a state in which the pouch case is contracted after being expanded.

Figure 9C:
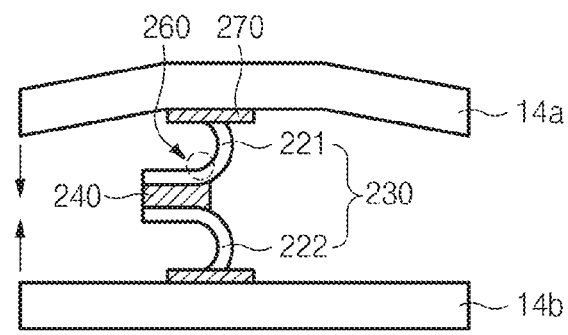
FIG. 9C is a cross-sectional view taken along line A-A of FIG. 8 when the battery cell is in a state in which the pouch case is contracted after being expanded.

Referring to FIGS. 9A to 9C, when the battery cell 10 is normally operated, gas is not present in the battery cell 10, such that the first inner lead 221 and the second inner lead 222 are maintained in a state in which they are overlapped with each other. When the gas is filled in the battery cell 10 due to generation of overcharge, the pouch case 14 is expanded. When the pouch case 14 is expanded, tension is generated in the first inner lead 221 and the second inner lead 222 in a direction in which the first inner lead 221 and the second inner lead 222 become distant from each other. Meanwhile, the first inner lead 221 and the second inner lead 222 are spaced apart from each other at a portion at which the insulator 250 that does not have adhesive properties is disposed.

Since force acts on the first inner lead 221 and the second inner lead 222 in the direction in which the first inner lead 221 and the second inner lead 222 become distant from each other due to the pouch adhesion layer 270, fracture is generated in the weak part 230. Therefore, the first inner lead 221 and the second inner lead 222 lose a function of a conducting wire, and a current is blocked. Then, even though the pouch case 14 is contracted, a shape in which the first inner lead 221 and the second inner lead 222 are spaced apart from each other is maintained as it is since the electrode lead 200 is made of a plastic material Therefore, even though an abnormal state ends, an over-current does not again flow to the electrode assembly 11, and stability in the use of the battery cell 10 may be secured.

Meanwhile, according to the present exemplary embodiment, the weak part 230 is formed at a connection point between the first inner lead 221 and the second inner lead 222. Therefore, a separate insulator is not required. In this case, a length of a conducting wire is shortened due to absence of the insulator. That is, a current path is shortened, such that a resistance is reduced.

Figure 10A:
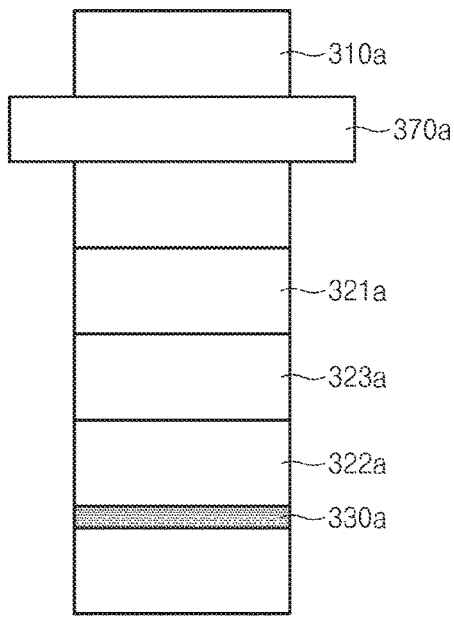
FIG. 10A is a plan view of an electrode lead according to still another exemplary embodiment of the present invention before being assembled.
Figure 10B:
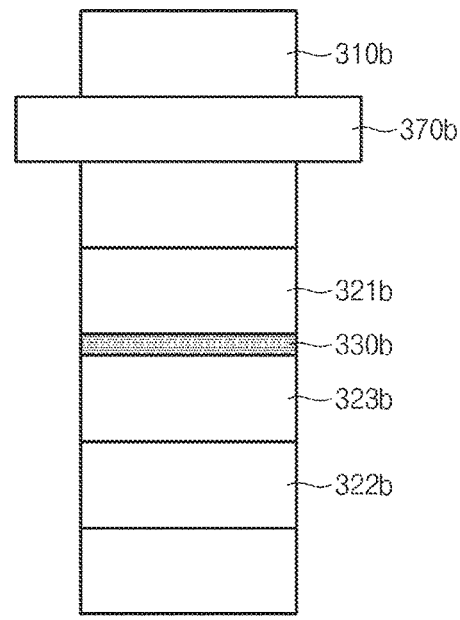
FIG. 10B is a plan view of an electrode lead different from that of FIG. 10A before being assembled.
Figure 10C:
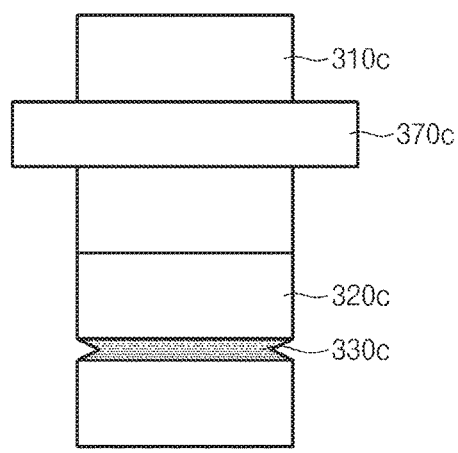
FIG. 10C is a plan view of an electrode lead different from that of FIG. 10B before being assembled.

FIG. 10A is a plan view of an electrode lead 300_a_, 300_b_, or 300_c_ according to still another exemplary embodiment of the present invention before being assembled; FIG. 10B is a plan view of an electrode lead 300_a_, 300_b_, or 300_c_ different from that of FIG. 10A before being assembled; and FIG. 10C is a plan view of an electrode lead 300_a_, 300_b_, or 300_c_ different from that of FIG. 10B before being assembled.

Figure 11:
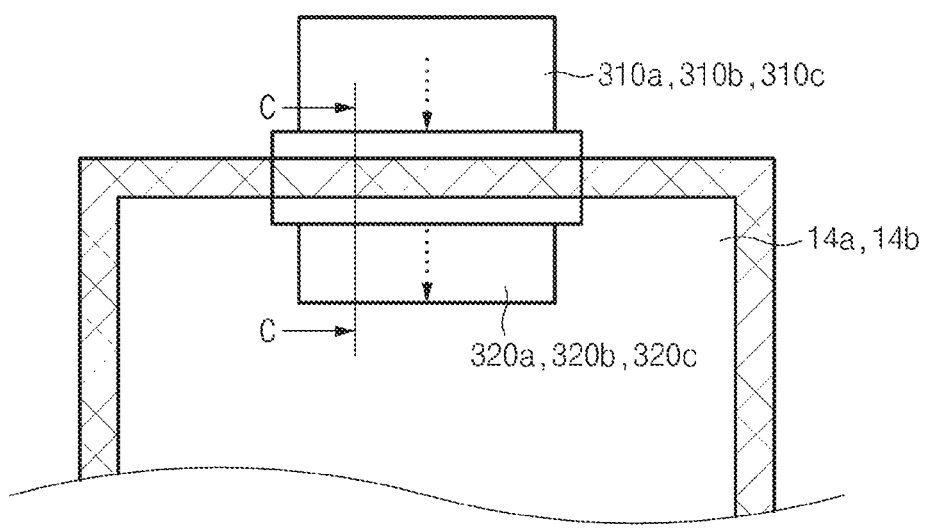
FIG. 11 is a plan view illustrating a state in which the electrode lead according to still another exemplary embodiment of the present invention and a pouch case are coupled to each other.

FIG. 11 is a plan view illustrating a state in which the electrode lead 300_a_, 300_b_, or 300_c_ according to still another exemplary embodiment of the present invention and a pouch case 14 are coupled to each other.

Referring to FIGS. 10A to 11, the battery cell 10 according to the present exemplary embodiment includes the electrode assembly 11; the pouch case 14 accommodating the electrode assembly 11 therein; and the electrode lead 300a, 300b, or 300c including an outer lead 310a, 310b, or 310c protruding to the outside of the pouch case 14 and an inner lead 320a, 320b, or 320c disposed between the outer lead 310a, 310b, or 310c and the electrode assembly 11, accommodated in the pouch case 14, having a length direction that is in parallel with a straight line connecting the electrode assembly 11 and the outer lead 310a, 310b, or 310c to each other at the shortest length, and moving in opposite directions by expansion force of the pouch case 14 to thereby be cut The battery cell 10 according to the present exemplary embodiment includes the electrode assembly 11; the pouch case 14 accommodating the electrode assembly 11 therein; and the electrode lead 300a, 300b, or 300c including the outer lead 310a, 310b, or 310c protruding to the outside of the pouch case 14 and the inner lead 320a, 320b, or 320c disposed between the outer lead 310a, 310b, or 310c and the electrode assembly 11 and accommodated in the pouch case 14, wherein the inner lead 320a, 320b, or 320c has two surfaces coupled to the pouch case 14 and is bent in an 'S' shape.

The pouch case 14 has the first surface 14a and the second surface 14b facing each other, and the inner lead 320a, 320b, or 320c includes a first inner lead 321a, 321b, or 321c connected to the outer lead 310a, 310b, or 310c and coupled to the first surface 14a; and a second inner lead 322a, 322b, or 322c coupled to the second surface 14b and connected to the electrode assembly 11. Pouch adhesion layers 370a, 370b, or 370c coupling the pouch case 14 and the inner lead 320a, 320b, or 320c to each other are formed between the first surface 14a and the first inner lead 321a, 321b, or 321c and between the second surface 14b and the second inner lead 322a, 322b, or 322c, and a weak part 330a, 330b, or 330c having brittleness higher than that of the pouch adhesion layers 370a, 370b, or 370c is formed in the inner lead 320a, 320b, or 320c.

The weak part 330a, 330b, or 330c is formed at one side based on the pouch adhesion layer 370a, 370b, or 370c, and a bent part 360a, 360b, or 360c bent when the pouch case 14 is expanded is formed at the other side based on the pouch adhesion layer 370a, 370b, or 370c. A notch is formed in the weak part 330a, 330b, or 330c. The notch may have a groove shape or have a shape in which holes are formed at predetermined intervals. The notch promotes fracture of the electrode lead 300a, 300b, or 300c.

The inner lead 320a, 320b, or 320c further includes an intermediate lead 323a or 323b connecting the first inner lead 321a, 321b, or 321c and the second inner lead 322a, 322b, or 322c to each other. The intermediate lead 323a or 323b is disposed between the first inner lead 321a, 321b, or 321c and the second inner lead 322a, 322b, or 322c so as to be overlapped with the first inner lead 321a, 321b, or 321c and the second inner lead 322a, 322b, or 322c. Lead adhesion layer 340a or 340b containing an insulation and adhesion component is formed in any one of a space between the first inner lead 321a, 321b, or 321c and the intermediate lead 323a or 323b and a space between the second inner lead 322a, 322b, or 322c and the intermediate lead 323a or 323b.

The lead adhesion layer 340a or 340b is formed in any one of the space between the first inner lead 321a, 321b, or 321c and the intermediate lead 323a or 323b and the space between the second inner lead 322a, 322b, or 322c and the intermediate lead 323a or 323b, and an insulator 350a, 350b, or 350c does not have adhesive properties but has an insulation property is disposed at the other thereof.

The bent part 360a, 360b, or 360c is formed between the first inner lead 321a, 321b, or 321c and the intermediate lead 323a or 323b and between the intermediate lead 323a or 323b and the second inner lead 322a, 322b, or 322c, and the weak part 330a, 330b, or 330c is formed in the bent part 360a, 360b, or 360c. The insulator 350a, 350b, or 350c is disposed at an overlapped portion of the inner lead 320a, 320b, or 320c in which the weak part 330a, 330b, or 330c is formed. The weak part 330a, 330b, or 330c is disposed at one side of the insulator 350a, 350b, or 350c, and the lead adhesion layer 340a or 340b is disposed at the other side of the insulator 350a, 350b, or 350c.

The first inner lead 321a, 321b, or 321c, the intermediate lead 323a or 323b, and the second inner lead 322a, 322b, or 322c are bent in an 'S' shape, and are formed integrally with each other. At least one of the first inner lead 321a, 321b, or 321c, the second inner lead 322a, 322b, or 322c, and the intermediate lead 323a or 323b may be made of a plastic material that is plastically deformed by the expansion of the pouch case 14.

Figure 12A:
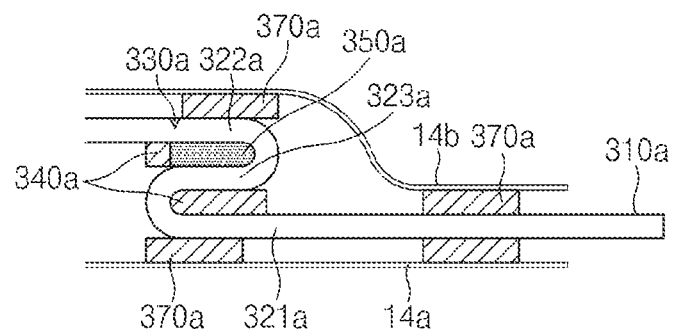
FIG. 12A is a cross-sectional view taken along line C-C of FIG. 11 when the battery cell is in a normal state and an electrode lead corresponds to that of FIG. 10A.
Figure 12B:
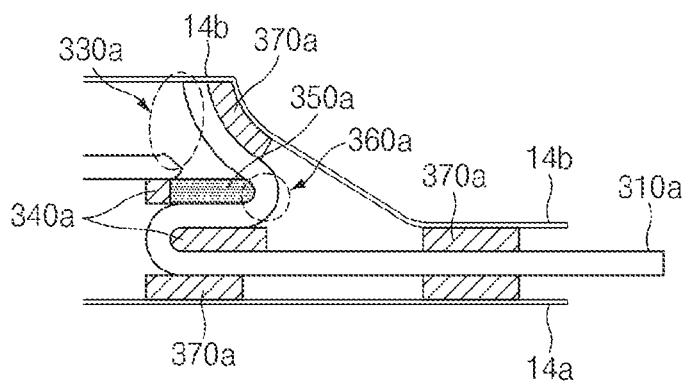
FIG. 12B illustrates a state of the battery cell in which a pouch case is expanded, such that the electrode lead is cut.
Figure 12C:
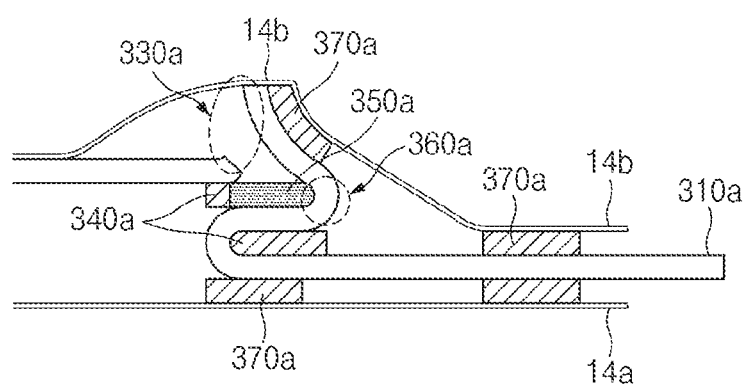
FIG. 12C illustrates a state of the battery cell in which the pouch case is contracted after being expanded.
Figure 13A:
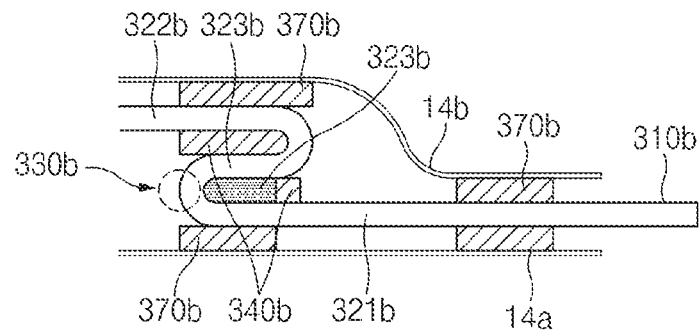
FIG. 13A is a cross-sectional view taken along line C-C of FIG. 11 when the battery cell is in a normal state and an electrode lead corresponds to that of FIG. 10B.
Figure 13B:
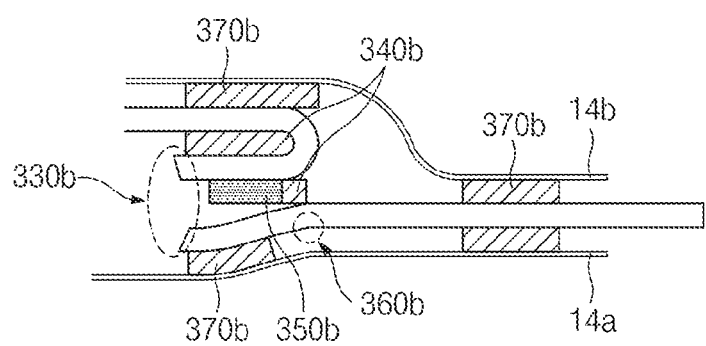
FIG. 13B illustrates a state of the battery cell in which a pouch case is expanded, such that the electrode lead is cut.
Figure 13C:
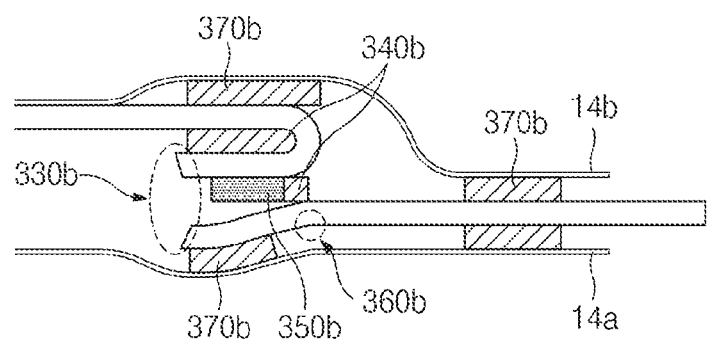
FIG. 13C illustrates a state of the battery cell in which the pouch case is contracted after being expanded.

FIG. 12A is a cross-sectional view taken along line C-C of FIG. 11 when the battery cell 10 is in a normal state and an electrode lead 300a, 300b, or 300c corresponds to that of FIG. 10A; FIG. 12B illustrates a state of the battery cell 10 in which a pouch case is expanded, such that the electrode lead 300a, 300b, or 300c is cut,; and FIG. 12C illustrates a state of the battery cell 10 in which the pouch case is contracted after being expanded. FIG. 13A is a cross-sectional view taken along line C-C of FIG. 11 when the battery cell 10 is in a normal state and an electrode lead 300a, 300b, or 300c corresponds to that of FIG. 10B; FIG. 13B illustrates a state of the battery cell 10 in which a pouch case is expanded, such that the electrode lead 300a, 300b, or 300c is cut; and FIG. 13C illustrates a state of the battery cell 10 in which the pouch case is contracted after being expanded.

Referring to FIGS. 12A to 13C, when the battery cell 10 is normally operated, gas is not present in the battery cell 10, such that the first inner lead 321a, 321b, or 321c, the second inner lead 322a, 322b, or 322c, and the intermediate lead 323a or 323b are maintained in a state in which they are overlapped with each other. When the gas is filled in the battery cell 10 due to generation of overcharge, the pouch case 14 is expanded. When the pouch case 14 is expanded, tension is generated in the first inner lead 321a, 321b, or 321c and the second inner lead 322a, 322b, or 322c in a direction in which the first inner lead 321a, 321b, or 321c and the second inner lead 322a, 322b, or 322c become distant from each other. Meanwhile, the first inner lead 321a, 321b, or 321c or the second inner lead 322a, 322b, or 322c is spaced apart from the intermediate lead 323a or 323b at a portion at which the insulator 350a, 350b, or 350c that does not have adhesive properties is disposed. Since force acts on the first inner lead 321a, 321b, or 321c and the second inner lead 322a, 322b, or 322c in the direction in which the first inner lead 321a, 321b, or 321c and the second inner lead 322a, 322b, or 322c become distant from each other due to the pouch adhesion layer 370a, 370b, or 370c, fracture is generated in the weak part 330a, 330b, or 330c. Therefore, the electrode lead 300a, 300b, or 300c loses a function of a conducting wire, and a current is blocked. Then, even though the pouch case 14 is contracted, a shape in the first inner lead 321a, 321b, or 321c and the second inner lead 322a, 322b, or 322c are spaced apart from the intermediate lead 323a or 323b is maintained as it is since the electrode lead 300a, 300b, or 300c is made of a plastic material. Therefore, even though an abnormal state ends, an over-current does not again flow to the electrode assembly 11, and stability in the use of the battery cell 10 may be secured.

Meanwhile, according to the present exemplary embodiment, the first inner lead 321a, 321b, or 321c, the intermediate lead 323a or 323b, and the second inner lead 322a, 322b, or 322c are formed as a straight line. Therefore, since a current path is shortened while blocking a current if necessary, a resistance is reduced.

Figure 14A:
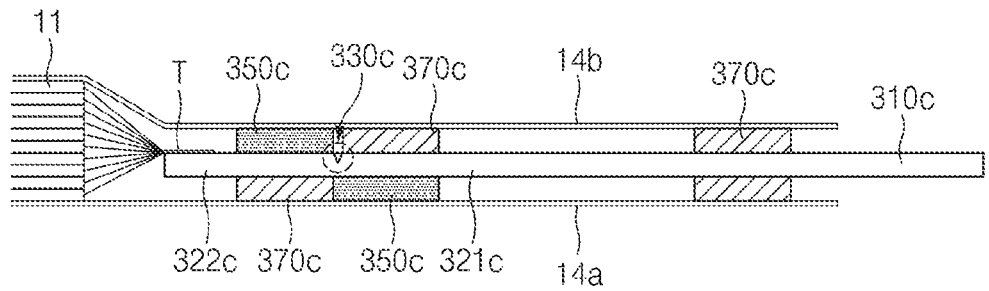
FIG. 14A is a cross-sectional view taken along line C-C of FIG. 11 when the battery cell is in a normal state and an electrode lead corresponds to that of FIG. 10$c$.
Figure 14B:
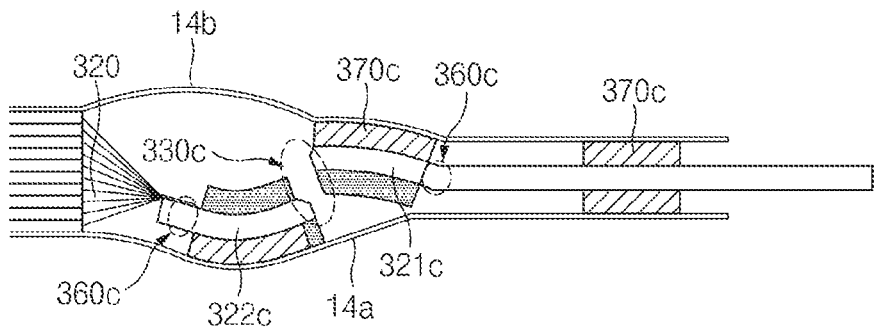
FIG. 14B illustrates a state of the battery cell in which a pouch case is expanded, such that the electrode lead is cut.

FIG. 14A is a cross-sectional view taken along line C-C of FIG. 11 when the battery cell 10 is in a normal state and an electrode lead 300a, 300b, or 300c corresponds to that of FIG. 10C; FIG. 14B illustrates a state of the battery cell 10 in which a pouch case is expanded, such that the electrode lead 300a, 300b, or 300c is cut; and FIG. 14C illustrates a state of the battery cell 10 in which the pouch case is contracted after being expanded.

Figure 14C:
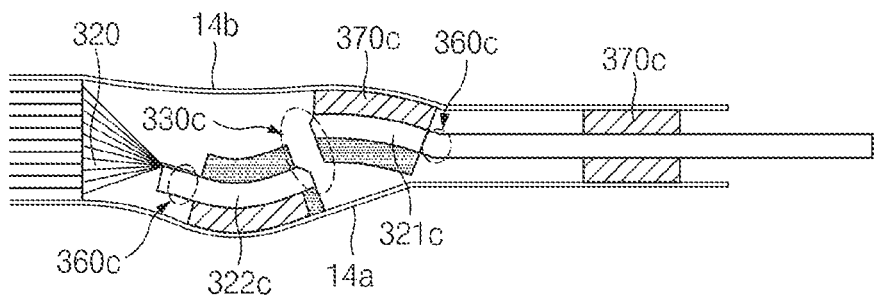
FIG. 14C illustrates a state of the battery cell in which the pouch case is contracted after being expanded.

Referring to FIGS. 14A to 14C, in the battery cell 10 according to the present exemplary embodiment, a notch is formed in the weak part 330c so as to reduce a thickness or a width of the inner lead 320c. A thickness and a width of the notch adjust a fracture point in time of the inner lead 320c. For example, fracture of the inner lead 320c may be generated when a voltage of the battery cell 10 is 5 to 6V. A notch formed in the inner lead 320c in which fracture of the weak part 330c is generated when a voltage of the battery cell 10 is 5V is deeper than a notch formed in the inner lead 320c in which fracture of the weak part 330c is generated when a voltage of the battery cell 10 is 6V.

The electrode tab T electrically connecting the electrode assembly 11 and the second inner lead 322c to each other is included between the second surface and the second inner lead 322c, any one surface of the second inner lead 322c is coupled to the electrode tab T and has the insulator 350 formed thereon, and the other surface of the second inner lead 322c that is not coupled to the electrode tab T is coupled to the pouch case 14 by the pouch adhesion layer 370c having an insulation property and adhesion, wherein the insulator 350 has an insulation property and does not have adhesive properties.

One surface of the first inner lead 321c positioned to be coplanar with one surface of the second inner lead 322c is coupled to the pouch case 14 by the pouch adhesion layer 370c, and the insulator 350 is disposed on the other surface of the first inner lead 321c positioned to be coplanar with the other surface of the second inner lead 322c.

The pouch adhesion layer 370c and the insulator 350c are formed in a diagonal direction based on the weak part 330c. Meanwhile, due to disposition of the electrode tab T, a space between the inner lead 320c and the pouch case 14 is changed based on the inner lead 320c. That is, the space between the inner lead 320c and the pouch case 14 may be narrow at a place at which the electrode tab T is disposed to act as a resistor to deformation of the electrode lead 300c. Therefore, the pouch adhesion layer 370c and the insulator 350c are appropriately disposed so that the electrode lead 300c becomes distant from the electrode tab T.

Meanwhile, areas of the pouch adhesion layer 370c and the insulator 350c or a level of adhesion of the pouch adhesion layer 370c is determined in terms of durability of the battery cell 10 and easiness of the fracture of the electrode lead 300c. In FIGS. 14A to 14C, an exemplary embodiment in which an area of the insulator 350c is larger than that of the pouch adhesion layer 370c based on the weak part 330c is illustrated. In this case, a fracture property of the electrode lead 300c is improved.

Meanwhile, an exemplary embodiment of FIGS. 14A to 14C is different from an exemplary embodiment of FIGS. 12A to 13C in that the inner lead 320a, 320b, or 320c may be disposed in the pouch case 14 while being maintained as a straight line without being overlapped In this case, a current path is further shortened in an exemplary embodiment of FIGS. 14A to 14C than in an exemplary embodiment of FIGS. 12A to 13C, such that a resistance is further reduced.

Since contents of an exemplary embodiment of FIGS. 14A to 14C except for the contents described above may be understood from a description for FIGS. 12A to 13C, a detailed description therefor will be omitted. An exemplary embodiment of FIGS. 14A to 14C is different from an exemplary embodiment of FIGS. 12A to 13C in that the inner lead 320a, 320b, or 320c may be disposed in the pouch case 14 while being maintained as a straight line without being overlapped In this case, a current path is further shortened in an exemplary embodiment of FIGS. 14A to 14C than in an exemplary embodiment of FIGS. 12A to 13C, such that a resistance is further reduced.

Figure 15A:
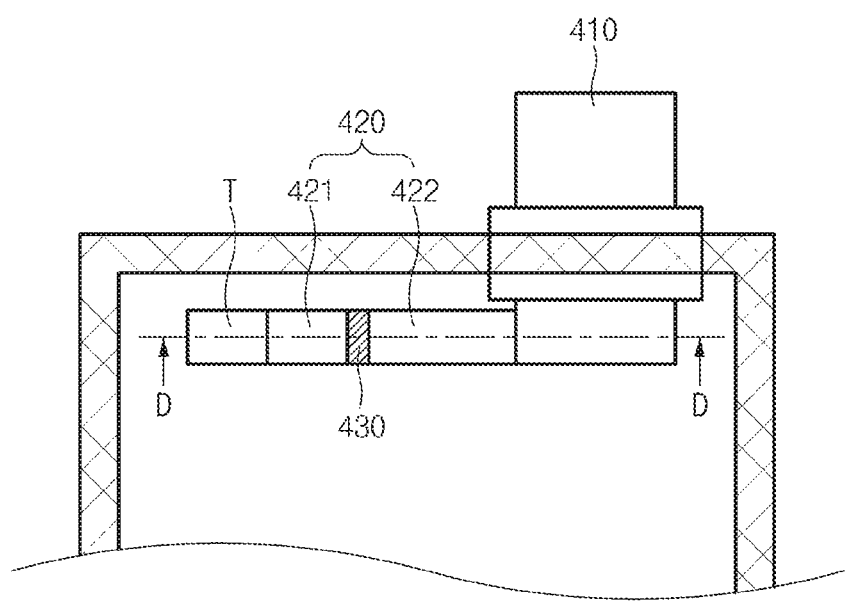
FIG. 15A is a plan view illustrating a state in which the electrode lead according to still another exemplary embodiment of the present invention and the pouch case are coupled to each other.
Figure 15B:
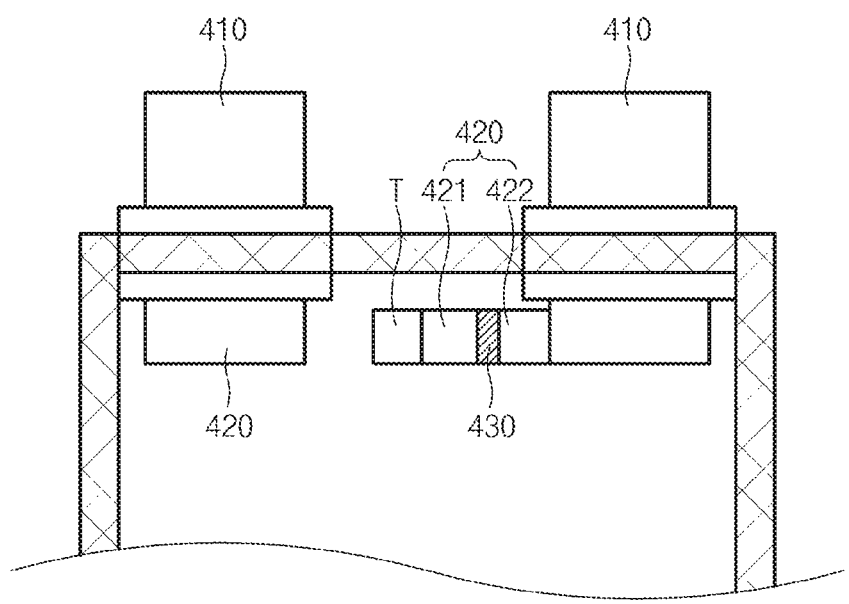
FIG. 15B illustrates an example in which an exemplary embodiment of FIG. 15A is applied to a battery cell in which a plurality of electrode leads are formed in one direction.

FIG. 15A is a plan view illustrating a state in which the electrode lead 400 according to still another exemplary embodiment of the present invention and the pouch case 14 are coupled to each other; and FIG. 15B illustrates an example in which an exemplary embodiment of FIG. 15A is applied to a battery cell 10 in which a plurality of electrode leads 400 are formed in one direction.

An exemplary embodiment of FIGS. 15A and 15B is similar to the exemplary embodiments described above. Hereinafter, a difference between an exemplary embodiment of FIGS. 15A and 15B and the exemplary embodiments described above will be mainly described. Referring to FIG. 15A, in the battery cell 10 according to still another exemplary embodiment of the present invention, an inner lead 420 may be lengthily formed in a left and right direction. That is, an outer lead 410 is lengthily formed in a front and rear direction, and the inner lead 420 is lengthily formed in the left and right direction. The inner lead 420 may be formed without being overlapped or bent. One end of the inner lead 420 is connected to the outer lead 420, and the other end of the inner lead 420 is connected to the electrode tab. A plane shape of an exemplary embodiment of FIGS. 15A and 15B is similar to that of an exemplary embodiment of FIGS. 2 and 6, and a cross-sectional shape and a coupling relation with the pouch case 14 are similar to an exemplary embodiment of FIG. 14A to 14C.

In addition, referring to FIG. 15B, the battery cell 10 may also be designed so that a plurality of electrode leads 400 are disposed in the same direction by appropriately adjusting disposition of an inner lead 420 in which a notch is formed and another inner lead 420 in which the notch is not formed.

Figure 16A:
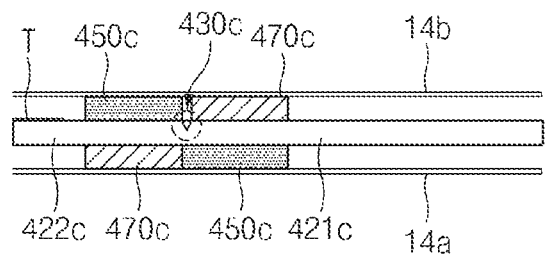
FIG. 16A is a cross-sectional view taken along line D-D of FIG. 15A when the battery cell is in a normal state.
Figure 16B:
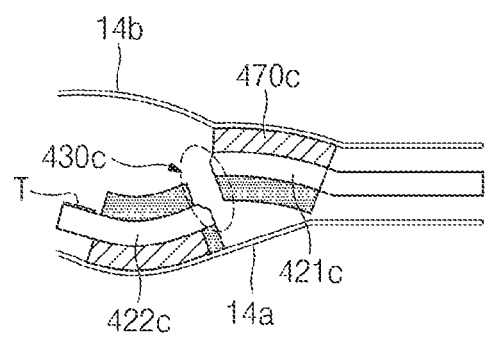
FIG. 16B is a cross-sectional view taken along line D-D of FIG. 15A when the battery cell is in a state in which a pouch case is expanded, such that the electrode lead is cut.
Figure 16C:
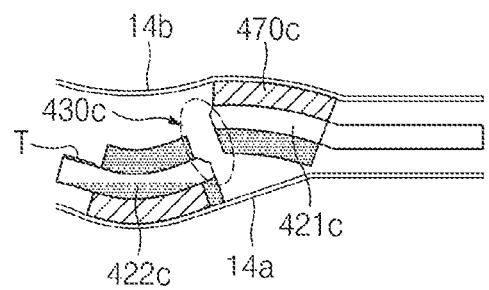
FIG. 16C is a cross-sectional view taken along line D-D of FIG. 15A when the battery cell is in a state in which the pouch case is contracted after being expanded.

FIG. 16A is a cross-sectional view taken along line D-D of FIG. 15A when the battery cell 10 is in a normal state; FIG. 16B is a cross-sectional view taken along line D-D of FIG. 15A when the battery cell 10 is in a state in which a pouch case is expanded, such that the electrode lead 400 is cut; and FIG. 16C is a cross-sectional view taken along line D-D of FIG. 15A when the battery cell 10 is in a state in which the pouch case is contracted after being expanded.

Fracture of the inner lead 420 described in FIGS. 15A and 15B is similar to an operation of an exemplary embodiment of FIGS. 14A to 14C. That is, when the pouch case 14 is expanded, the first surface 14a and the second surface 14b become distant from each other. Then, fracture is generated in a weak part 430 while the inner lead 420 adhered to the first surface 14a and the inner lead 420 adhered to the second surface 14b being tensioned. When the fracture is generated, even tough the pouch case 14 is contracted, the inner lead 420 is maintained in a form in which it is deformed. Therefore, a phenomenon that a current again flows to the battery cell 10 to overcharge the battery cell 10 is not generated.

As described above, according to the exemplary embodiments of the present invention, there are the following effects.

First, an electrode lead automatically blocking a current applied to a battery cell when the battery cell is overcharged is provided.

Second, a current applied to a battery cell is blocked through a mechanical operation without using a separate power supply or controller.

Third, an electrode lead having a current blocking function and capable of being formed in an integrated type is provided.

Fourth, a resistance is reduced by minimizing a path through which a current flows.

The effects of the present invention are not limited to the above-mentioned effects. That is, other effects that are not mentioned may be obviously understood by those skilled in the art from the claims.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A battery cell, comprising:
an electrode assembly;
a pouch case accommodating the electrode assembly therein; and
an electrode lead including an outer lead protruding to an outside of the pouch case and an inner lead having one end connected to the outer lead and an opposite end connected to the electrode assembly, accommodated in the pouch case, and configured to be cut by expansion force of the pouch case,
wherein the inner lead extends in a first direction and is bent in an opposite, second direction, and
wherein the inner lead includes a weak part, and at least a portion of the inner lead between the weak part and a bent part is coupled to the pouch case such that the weak part is configured to be cut as the pouch case expands.

2. The battery cell according to claim 1, wherein the pouch case has a first surface and a second surface facing each other, and
the inner lead includes:
a first inner lead connected to the outer lead and coupled to the first surface; and
a second inner lead connected to the first inner lead, coupled to the second surface, and connected to the electrode assembly.

3. The battery cell according to claim 2, wherein a pouch adhesion layer coupling the pouch case and the inner lead to each other is formed in at least one of a space between the first surface and the first inner lead and a space between the second surface and the second inner lead, and
the weak part is formed between the portion of the inner lead that is coupled to the pouch case by the pouch adhesion layer and a portion of the inner lead that is not coupled to the pouch case, the weak part having brittleness higher than that of other portions.

4. The battery cell according to claim 3, wherein a notch is formed in the weak part.

5. The battery cell according to claim 3, wherein the first inner lead and the second inner lead are disposed so as to be overlapped with each other, and
a lead adhesion layer containing an insulation and adhesion component is formed between the first inner lead and the second inner lead.

6. The battery cell according to claim 5, wherein an insulator that insulates the first inner lead and the second inner lead from each other is disposed between the first inner lead and the second inner lead, and
the lead adhesion layer is disposed at one side based on the weak part and the insulator is disposed at the other side based on the weak part.

7. The battery cell according to claim 6, wherein the lead adhesion layer is disposed at one side of the insulator, and the bent part bent when the pouch case is expanded is formed at the other side of the insulator.

8. The battery cell according to claim 7, wherein a notch is formed in the bent part.

9. The battery cell according to claim 7, wherein the first inner lead and the second inner lead are formed integrally with each other, and
the bent part is formed at a portion connecting the first inner lead and the second inner lead to each other.

10. The battery cell according to claim 5, wherein the pouch adhesion layer is disposed at only one side based on the weak part.

11. The battery cell according to claim 10, wherein the bent part bent when the pouch case is expanded is formed at an end portion of a portion at which the pouch adhesion layer is formed based on the weak part.

12. The battery cell according to claim 11, wherein the first inner lead and the second inner lead are formed integrally with each other, and
the bent part is formed at a portion connecting the first inner lead and the second inner lead to each other.

13. The battery cell according to claim 11, wherein the first inner lead and the second inner lead are compressed from the weak part to the bent part to thereby be bonded to each other so as to conduct electricity.

14. The battery cell according to claim 2, wherein at least one of the first inner lead and the second inner lead is made of a plastic material that is plastically deformed by expansion of the pouch case.

15. The battery cell according to claim 6, wherein the bent part bent when the pouch case is expanded is formed at an end portion of the pouch adhesion layer.

16. The battery cell according to claim 15, wherein the bent part is disposed at one side of the insulator, and the weak part is formed at the other side of the insulator.

17. The battery cell according to claim 5, wherein the weak part is formed at an end portion of the lead adhesion layer.

18. The battery cell according to claim 5, wherein the bent part bent when the pouch case is expanded is formed at an end portion of the pouch adhesion layer.

19. The battery cell according to claim 18, wherein a notch is formed in the bent part.

20. The battery cell according to claim 18, wherein the first inner lead and the second inner lead are compressed from the weak part to the bent part to thereby be bonded to each other so as to conduct electricity.

21. A battery cell, comprising:
an electrode assembly;
a pouch case accommodating the electrode assembly therein; and
an electrode lead including an outer lead protruding to an outside of the pouch case and an inner lead disposed between the outer lead and the electrode assembly and accommodated in the pouch case, wherein:
the inner lead includes a first inner lead and a second inner lead each coupled to the pouch case and overlapped with each other,
the pouch case has a first surface and a second surface facing each other,
the first inner lead is coupled to the first surface, and the second inner lead is coupled to the second surface,
the inner lead has a bent part between the first inner lead and the second inner lead such that the first inner lead and the second inner lead are overlapped with each other, and
the bent part is configured to be cut as a distance between the first inner lead coupled to the first surface and the second inner lead coupled to the second surface increases when the pouch case is expanded.

* * * * *